(12) United States Patent
Mansey et al.

(10) Patent No.: US 9,603,316 B1
(45) Date of Patent: Mar. 28, 2017

(54) METHOD AND SYSTEM FOR MONITORING AND CONTROL OF HYDROPONIC GROWING ENVIRONMENT

(71) Applicants: Jonathan Mansey, Lake Arrowhead, CA (US); Tristan Miller-Mansey, Lake Arrowhead, CA (US)

(72) Inventors: Jonathan Mansey, Lake Arrowhead, CA (US); Tristan Miller-Mansey, Lake Arrowhead, CA (US)

( * ) Notice: Subject to any disclaimer, the term of this patent is extended or adjusted under 35 U.S.C. 154(b) by 0 days.

(21) Appl. No.: 14/960,992

(22) Filed: Dec. 7, 2015

(51) Int. Cl.
- *A01G 31/02* (2006.01)
- *G05B 15/02* (2006.01)
- *A01G 1/00* (2006.01)

(52) U.S. Cl.
CPC ............ *A01G 31/02* (2013.01); *A01G 1/001* (2013.01); *G05B 15/02* (2013.01)

(58) Field of Classification Search
None
See application file for complete search history.

(56) References Cited

U.S. PATENT DOCUMENTS

| | | | | |
|---|---|---|---|---|
| 4,992,942 A | * | 2/1991 | Bauerle | A01G 31/00 700/284 |
| 5,184,420 A | * | 2/1993 | Papadopoulos | A01G 31/00 47/62 N |
| 5,283,974 A | * | 2/1994 | Graf, Jr. | A01G 9/00 47/60 |
| 5,566,069 A | * | 10/1996 | Clark, Jr. | G06F 3/033 702/2 |

(Continued)

FOREIGN PATENT DOCUMENTS

| | | |
|---|---|---|
| WO | WO-2012139053 | 10/2012 |
| WO | WO-2013126023 | 8/2013 |

(Continued)

OTHER PUBLICATIONS

Leaf: The automatic cannabis grow system web page, Growing Your Own Cannabis Has Never Been Easier, downloaded from the internet Dec. 4, 2015, <http://www.getleaf.co/>.

(Continued)

*Primary Examiner* — Christopher E Everett
(74) *Attorney, Agent, or Firm* — Fox Rothschild LLP (57) ABSTRACT

Methods and systems for monitoring and control of hydroponic growing environment are disclosed. One or more sensing devices are provided to capture the conditions of a hydroponic growing environment via one or more reservoir or air sensors. The sensing devices can further communicate with and control a multiple-outlet power delivery device to make adjustment to the hydroponic growing environment. The power delivery device may include one or more power outlets, each of which can be activated or deactivated to turn on/off an environmental control equipment items. The sensing device may also communicate with a remote server, which may retrieve sensor data about the environmental conditions from the sensing device. The remote server may monitor the environmental conditions and automatically adjust the growing environment by controlling the power delivery device. A user may also access the remote server, monitor and control the hydroponic growing environment via the remote server.

22 Claims, 5 Drawing Sheets

(56) References Cited

U.S. PATENT DOCUMENTS

| | | | | |
|---|---|---|---|---|
| 5,590,490 | A * | 1/1997 | Kikuchi | A01G 31/00 47/59 R |
| 5,771,634 | A * | 6/1998 | Fudger | G05D 27/02 47/59 R |
| 7,617,057 | B2 | 11/2009 | May et al. | |
| 7,987,632 | B2 | 8/2011 | May et al. | |
| 8,649,907 | B2 * | 2/2014 | Ersavas | A01G 1/00 700/275 |
| 8,725,301 | B2 * | 5/2014 | Carskadon | A01G 27/001 137/101.27 |
| 2005/0240313 | A1 * | 10/2005 | Cartwright | A01G 25/167 700/284 |
| 2006/0043208 | A1 * | 3/2006 | Graham | A01G 25/16 239/71 |
| 2007/0289207 | A1 * | 12/2007 | May | A01G 7/00 47/17 |
| 2008/0027586 | A1 * | 1/2008 | Hern | G01W 1/14 700/284 |
| 2008/0120335 | A1 * | 5/2008 | Dolgoff | G05B 23/0216 |
| 2009/0025287 | A1 * | 1/2009 | Lee | A01G 7/00 47/17 |
| 2009/0223128 | A1 * | 9/2009 | Kuschak | A01G 31/00 47/62 N |
| 2010/0263275 | A1 * | 10/2010 | Anderson | A01G 25/167 47/58.1 R |
| 2010/0268562 | A1 * | 10/2010 | Anderson | G06Q 10/06315 705/7.25 |
| 2012/0261486 | A1 * | 10/2012 | Sarver | A01G 25/167 239/11 |
| 2013/0060473 | A1 * | 3/2013 | Tomida | A01G 25/167 702/3 |
| 2013/0173070 | A1 * | 7/2013 | Tennyson | G05B 19/02 700/284 |
| 2014/0026474 | A1 | 1/2014 | Kulas | |
| 2014/0101139 | A1 * | 4/2014 | Gemert | G06F 17/30528 707/722 |
| 2014/0115958 | A1 * | 5/2014 | Helene | A01G 1/001 47/17 |
| 2014/0144078 | A1 * | 5/2014 | Gonyer | A01G 31/02 47/62 A |
| 2014/0180596 | A1 | 6/2014 | Frey | |
| 2014/0200690 | A1 | 7/2014 | Kumar | |
| 2016/0021836 | A1 * | 1/2016 | Kernahan | H04L 67/10 700/284 |
| 2016/0050862 | A1 * | 2/2016 | Walliser | A01G 31/02 47/62 E |

FOREIGN PATENT DOCUMENTS

| | | |
|---|---|---|
| WO | WO-2014014744 | 1/2014 |
| WO | WO-2015140820 | 9/2015 |

OTHER PUBLICATIONS

NIWA Home page, Let's get the world growing, downloaded from the internet Dec. 4, 2015, <http://getniwa.com/>.

SmartBee Controllers web page, downloaded from the internet Dec. 4, 2015, <http://smartbeecontrollers.com/>.

* cited by examiner

METHOD AND SYSTEM FOR MONITORING AND CONTROL OF HYDROPONIC GROWING ENVIRONMENT

BACKGROUND

This disclosure relates to methods and systems for monitoring and control of hydroponic plant growing environments.

Hydroponic gardens and farms efficiently grow plants indoors, using no soil and yielding bigger, tastier, healthier produce year round. Hydroponic gardens use much less water than standard, soil-based gardens, which is critical in areas facing drought conditions. This is the future of farming for both urban growers and developing worlds alike. Key to the success and high yields of hydro-gardening is scientific-grade monitoring of the conditions and accurate control of the growing environment.

The legacy or pre-existing devices for monitoring hydroponic gardens are the manual and static "instantaneous" reading measuring instruments, such as air and liquid thermometers, hygrometers, and pH and electrical conductivity (EC) testers. These devices are traditionally used to monitor indoor growing systems by the user, at a prescribed time of day, manually inserting the tester into the air environment or nutrient solution and reading a result on a display. The user may note it mentally or in a log book or spreadsheet. Later the user may manually create a chart to show slow moving trends in the values in order to take remedial action, such as feed more nutrient, raise the pH, increase humidity or $CO_2$. In order to implement these changes, some other manual operations would be required, such as to turn on a fan to reduce temperature, or inject pH adjuster into a reservoir. The effectiveness of the manual operations would depend on the skill and experience of the person, and could not consider many real-time conditions of the growing environment.

This document describes methods and devices that are directed to solving at least some of the issues described above.

SUMMARY

The embodiments disclose a method and system for controlling a hydroponic growing environment. In one embodiment, the system includes a multi-outlet power delivery device and a hydroponic reservoir sensing device. The multi-outlet power delivery device may include a plurality of power outlets, a communication system, and a controller that selectively switches each of the power outlets on or off in response to commands received via the communication system. The power outlets may be connected to one or more environmental controllers that can be activated and deactivated, to turn an environmental equipment on and off in order to alter the environmental conditions of the hydroponic growing environment.

The hydroponic reservoir sensing device may include a probe containing one or more reservoir sensors that monitor one or more parameters of a nutrient solution in a hydroponic reservoir, a transmitter, and a controller. The controller may receive data captured by the one or more reservoir sensors, determine whether the received data is outside of a desired range of values for an environmental condition of the hydroponic reservoir. In response to determining that the received data is outside of the desired range of values, the controller of the hydroponic reservoir may identify an environmental controller that, when activated or deactivated, will alter the environmental condition. The controller may further generate a command to turn the environmental controller on or off, and cause the transmitter of the sensing device to transmit the generated command to the multi-outlet power delivery device via a communications network. The controller of the multi-outlet power delivery device will switch an outlet associated with the environmental controller on or off in response to the generated command.

In one embodiment, the system may also include an air sensing device, which may include a probe containing one or more air sensors that can monitor one or more parameters of air that is proximate to the plants, a transmitter and a controller. The controller may receive data captured by the one or more air sensors, determine whether the received data captured by the one or more air sensors is outside of a desired range of values for an environmental condition of the air. In response to determining that the received data is outside of the desired range of values, the controller of the air sensing device may identify an environmental controller that, when activated or deactivated, will alter the environmental condition. The controller may also generate a command to turn the environmental controller on or off, and cause the transmitter to transmit the generated command to the multi-outlet power delivery device via a communications network. The controller of the multi-outlet power delivery device will switch an outlet associated with the environmental controller on or off in response to the generated command.

In one embodiment, the reservoir sensors may include an electrical conductivity sensor, a pH sensor or a reservoir temperature sensor. The air sensors may include at least an air temperature sensor, an air humidity sensor or a $CO_2$ sensor. Additionally or alternatively, the environmental controller may include a nutrient doser or a reservoir chiller, a pump, a heater, an air conditioning unit, a humidifier, a light, a fan, a gas solenoid valve or a liquid solenoid valve.

In one embodiment, the system may also include a remote server that can communicate with the one or more sensing devices and receive data captured by the one or more sensors in the sensing devices and store the captured data on the server. The remote server may be cloud-based or otherwise. A user device may be in communication with the remote server and send a query (via a user interface on the user device) about an environmental condition of the hydroponic reservoir. In response to the user's request, the remote server may extract relevant data from stored data on the server and transmit to the user device the resulting data responsive to the query. The user device may display the resulting data to the user via its graphical user interface.

Additionally and/or alternatively, the remote server may control the multi-outlet power delivery device so as to switch on/off each of the power outlets connected to it. The control may be based on the captured data from the sensing devices. In another embodiment, the user device may be in direct communication with the multi-outlet delivery device to control each of the power outlets connected to it. Whether the control is done by the remote server or the user device, at least a portion of the captured data from the sensing devices is compared with a threshold value to determine whether the resulting data indicates that a parameter of the nutrient solution in the hydroponic reservoir requires adjustment. If the resulting data indicates that a particular parameter of the nutrient solution in the hydroponic reservoir requires adjustment, the remote server or the user device sends a command, via a wireless communication link, to the multiple-outlet power delivery device to turn an identified power outlet on/off thus adjust the environmental condition of the hydroponic growing environment.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, the term "electronic device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera or other image capturing device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, smart watches, digital cameras, tablet computing devices, electronic readers, personal computers, cloud-based servers, fitness tracking devices, wearable electronic devices, wearable electronic devices, media players, satellite navigation devices and the like.

The term "hydroponic growing environment" refers to a plant growing environment, in which plants grow with their roots submerged directly into water-based solvents instead of soil. This environment includes hydroponic gardening, hydroponic farming and their variations, and they are suitable for growing plants, trees, vegetables, flowers, fruits, herbs and the like. The hydroponic growing environment can be outdoor and indoor, open air or closed closet, and it can be with or without a reservoir.

Each of the terms "hydroponic environment actuator," "actuator," and "hydroponic environment controller" refers to a device that can electronically control the operations of various equipment or devices used in the hydroponic growing environment, such as turning on/off an air conditioning (A/C) unit, a chiller, a watering device and a pH injector, increasing or decreasing the temperature setting of a heater, turning on/off and adjusting the water pressure of a gardening irrigation system, or the like. The hydroponic environment actuator or controller can receive control commands, wired or wirelessly, to implement a control upon the selected equipment connected to it.

The term "hydroponic sensor" refers to a sensor for use in a hydroponic growing environment for monitoring the growing environment. A hydroponic sensor may include one or more reservoir sensors that are capable of measuring various conditions in the hydroponic reservoir, such as water temperature, pH value, electrical conductivity (EC), nutrients etc. In addition or alternatively, a hydroponic sensor may also include one or more air sensors that are capable of measuring one or more parameters of the air in the proximity to the growing environment, such as air temperature, air humidity, $CO_2$ or the like. A hydroponic sensor may also include one or more sensors for monitoring the operational conditions of devices and systems that are used in the growing environment, such as the voltage, current or temperate range of various electronic devices and equipment, or the like. A hydroponic sensor may also include any other sensors for monitoring conditions that may affect the hydroponic growing environment. A hydroponic sensor may have various interfaces, analog or digital, such as a wire, a probe, an $i^2C$ interface or any interface or protocol that enables the sensor to transmit its readings to a reading device.

The term "sensing device" refers to a device having one or more hydroponic sensors and other hardware that can process and/or transmit sensor readings to an external device via a communication interface, such as via a Wi-Fi interface, antenna, communication port or the like. A hydroponic sensor device also may include a processor and other circuitry for processing the collected data.

According to one embodiment, a suite of small and smart, network-connected hydroponic grow room sensing devices are connected to a cloud-based remote server via a communication network so that monitored data can be accessed with an application on a user's electronic device, such as a mobile phone or tablet. Sensing devices take the readings from the plant environment and send data via the cloud to the user local devices to enable growers to get visual insight into their plants' health and needs. Automated controls may keep the growing environment in check to improve plant growth, by allowing a user to monitor and control the hydroponic garden from an external electronic device.

Figure 1:
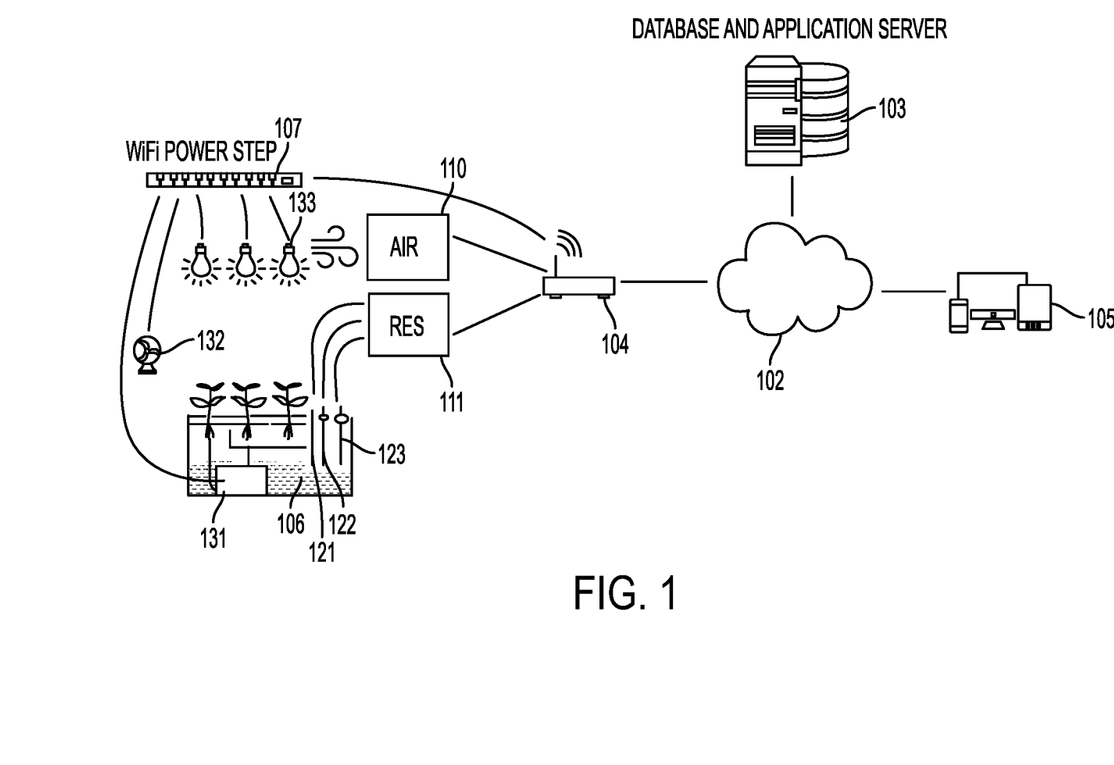
FIG. 1 illustrates a monitoring and control system and method according to an embodiment.

With reference to FIG. 1, an air sensing device 110 and a reservoir sensing device 111 include associated sensors that are configured to collect readings of key environmental parameters of the growing environment. The systems may be programmed to repeatedly collect the data at one or more time intervals and store the data locally in the sensing device and/or in a remote server 103. The sensing devices 110, 111 can communicate with cloud-based or otherwise remote server 103 via a WiFi gateway/router 104 or other appropriate communications hardware (such as mesh network device) and a wireless communication network 102.

The air sensing device 110 and reservoir sensing device 111 may be separate devices, components of a single device, or they may be made up of several components distributed across multiple devices. Example sensors of the air sensing device 110 may include an air temperature sensor, a relative humidity sensor, a $CO_2$ sensor, a light sensor, or other sensors configured to analyze the air and measure one or more parameters of the air. Example sensors of the reservoir sensing device 111 may include a reservoir liquid temperature sensor, a pH sensor, an electrical conductivity (EC) sensor, and a dissolved oxygen sensor. Any or all of these sensors may be contained within a housing of the associated device, or they may be included on one or more probes 121, 122, 123 attached and connected to the sensing device via one or more data transmission links. For example, as shown in FIG. 1, various probes 121, 122, 123 of the reservoir sensing device 111 may be placed in the nutrient reservoir 106 of the hydroponic growing environment to collect various parameters about the nutrients in the reservoir.

Figure 2:
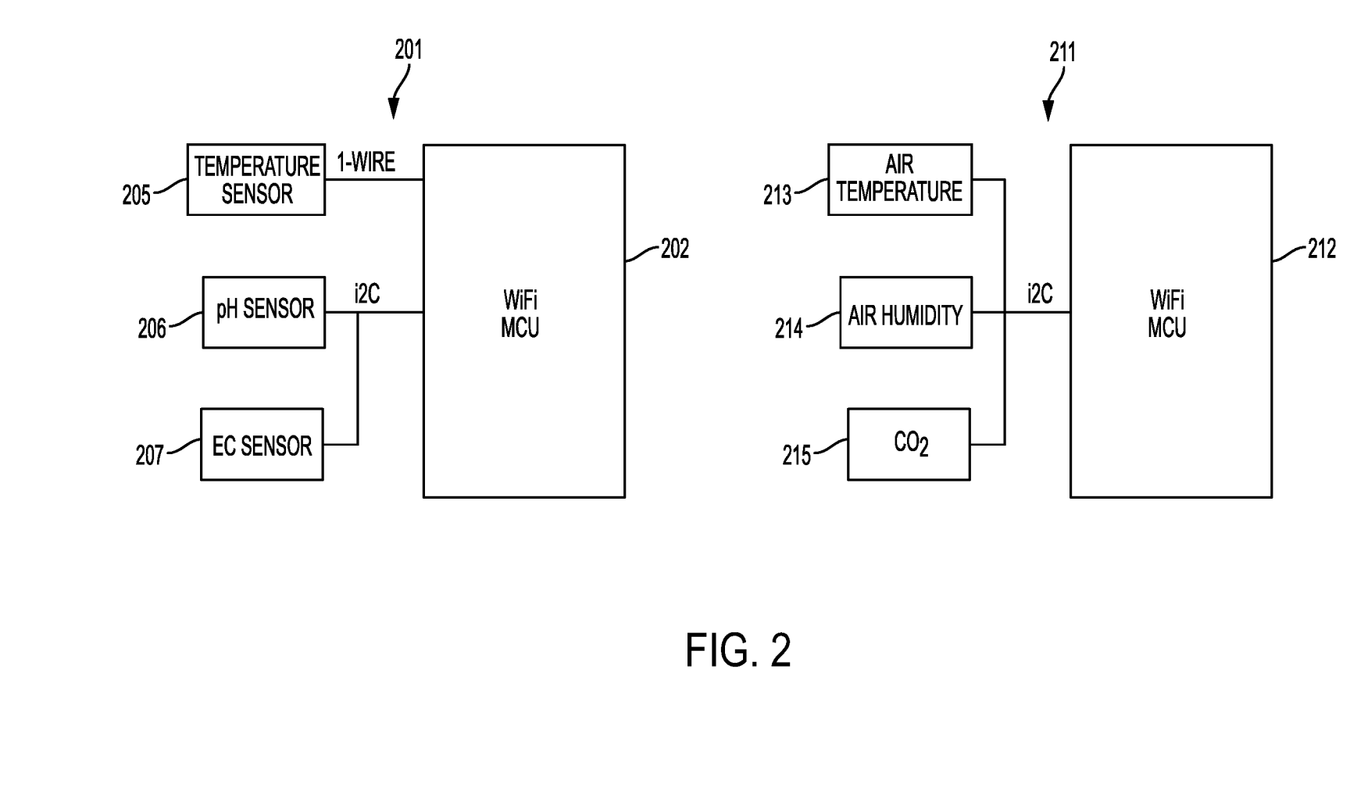
FIG. 2 illustrates examples of wireless sensing devices for monitoring parameters of hydroponic environment.

Various sensors may be available off-the-shelf or build to custom parameters in the form of a single wire, multiple wires, a tube or a probe. For example, a temperature sensor may be an analog device and is connected to the micro controller (MCU) by a wire such as a co-axial cable. In another example, an analog probe, such as pH sensor or a EC sensor, may be connected to a "pre-processor" or "interface module" that has an analog-digital (A/D) conversion stage and/or digital signal processing to amplify and filter the readings. The A/D converted and/or amplified or filtered sensor readings can be transferred to the sensing device via a digital interface such as an $i^2c$ interface. Each sensing device may comprise one or more sensors, a processor such as a micro controller module (MCU), and a communication interface such as an antenna and associated circuitry for WiFi communication. With reference to FIG. 2, in an reservoir sensing device 201, a MCU 202 may be connected to a WiFi interface (both as receiver and transmitter) and electrically coupled to one or more hydroponic reservoir sensors for monitoring the environmental condition of the nutrient reservoir, such as a liquid temperature sensor 205, a pH probe sensor module 206 and an EC sensor module 207. Similarly, in an air sensing device 211, a MCU 212 may be connected to a WiFi interface and electrically coupled to one or more air sensors for monitoring the air proximate to the plants that are growing in and extending out of the hydroponic reservoir, such as near the canopy of the plants. The air sensors may include air temperature sensor 213, relative humidity sensor 214, and $CO_2$ sensor 215. Data that is read by the reservoir sensors may be transmitted wirelessly via the WiFi (or other communication) interface and a communication network to a remote server for monitoring or analyzing reservoir conditions.

The sensing devices may be powered by one or more power adaptors, such as a USB phone charger type power adapter. Each sensing device can also include a computer readable memory device or other processor-readable medium containing programming code that, when executed by the micro-controller of the MCU or other processing device, gathers the sensor data at a periodic time intervals (e.g. every minute) and causes the communication interface to upload it to the remote server.

Figure 3:
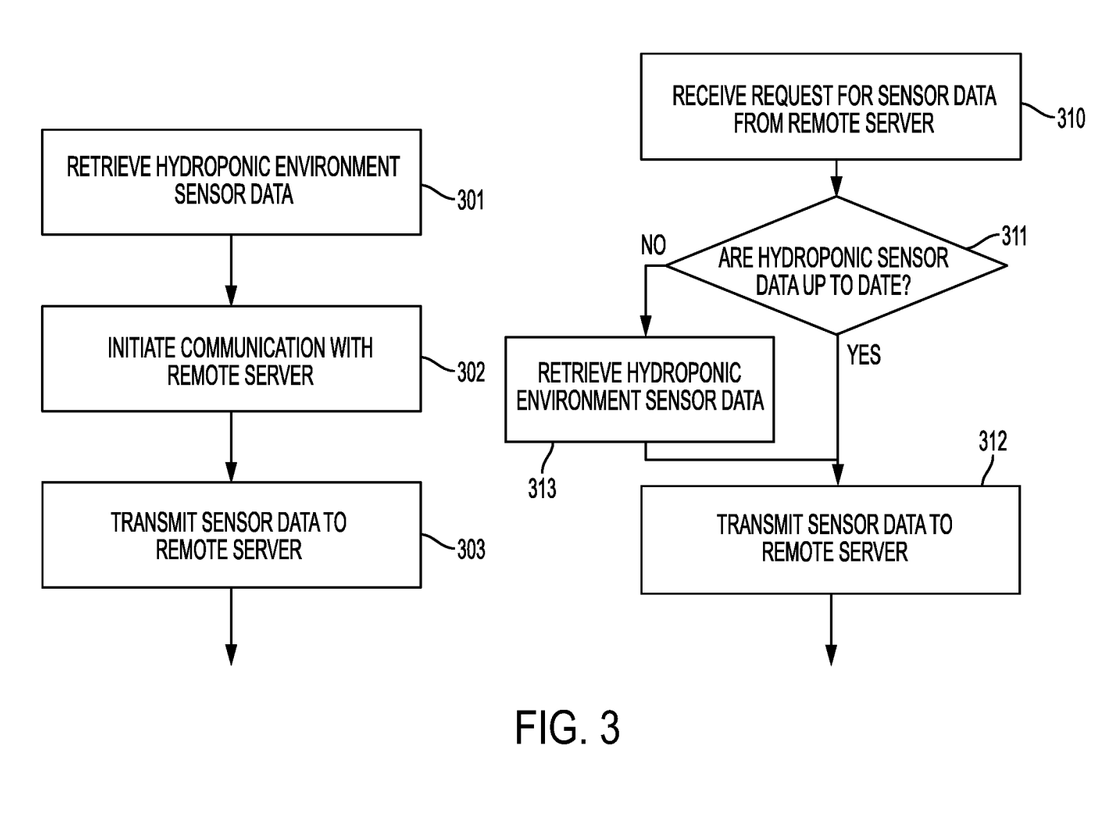
FIG. 3 illustrates push and pull modes for sensor devices according to an embodiment.

The uploading of sensor data can be realized in a push or pull mode. With reference to FIG. 3, in the push mode, the MCU of a sensing device retrieves the sensor data 301, initiates a request to communicate with the remote server 302, and upon establishing the connection with the remote server, transmits sensor data to the remote server 303. In the pull mode, the remote server initiates a communication with a selected sensing device, the selected sensing device receives and acknowledges the request 310 from the remote server, and then transmits the sensor data to the remote server 312. In another embodiment, a sensing device can retrieve data from each of the sensors connected to it and pre-store the data at a local storage medium to be later fetched by the remote server. Upon receiving a request for sensor data from the remote server, the sensing device checks whether the pre-stored sensor data is up to date 311. If the last sensor data reading is up to date, i.e., the sensor data has been taken within a threshold time period from when the request is received, the sensing device transmits the stored data to the server 312. Otherwise, it retrieves updated hydroponic environment sensor data 313 and transmits the new sensor data to the remote server.

In response to receiving sensor data, a remote server may control a hydroponic environment actuator or controller based on analyzing the readings of sensors. Returning to FIG. 1, a wirelessly controlled multi-outlet power delivery device 107 can take commands and control (by activation or deactivation) one or more environmental control equipment items to which it connects. For example, one or more outlets of the power delivery device 107, which optionally may have the form of a power strip, may be connected to a power cable that leads to an A/C unit for the air and/or a reservoir chiller that can be used to cool down the hydroponic environment. Other environmental control equipment items (which this document may refer to as "environmental controllers") include, for example, lights 133 which may alter the heat and/or light of the air in the hydroponic environment when activated or deactivated; a fan 132 or other component of an A/C unit or heater that can alter the temperature of the air in the hydroponic environment when activated or deactivated; or a nutrient pump 131 that can deliver nutrients to the nutrient reservoir 106 when activated. Other environmental controllers such as a heater, a humidifier, a light, a fan, a gas solenoid valve or a liquid solenoid valve may be used.

Alternatively, and/or additionally, the multi-outlet power delivery device may be controlled to turn on/off the one or more of outlets with accurate timing according to a clock signal. The clock signal may be from a sensing device, which has a built-in component to function as a timer that causes the sensing device to transmit commands at the right time to turn one or more outlets of the power delivery device on and off. In another embodiment, the sensing device can be time-synchronized to a remote server. In one example, the timer function of the sensing device can be configured to schedule the lights to be on for 18 hours and off for 6 hours each day during the vegetative phase of growth, and switch to 12 hours on 12 hours off for the flowering stage. In another example, the power delivery device can be timed to turn a flood pump on for 5 minutes every 4 hours.

In another embodiment, the timer function may be controlled by a remote server. When the power delivery device 107 communicates with a remote server, via a communication network, upon receiving a control command from the remote server, the power delivery device may turn on or off a selected one or more of its outlets, thus activating or deactivating the environmental controller to which the outlet connects and supplies power. For example, in one embodiment, the timer function of the power delivery device can be user programmable by a user application on a portable device such as a tablet or a smart phone, where the application is in communication with the remote server via a communication network. With the user application user can create, edit and store repeating events that are received by the MCU on either the air sensing device 110 or reservoir sensing device 111, which are subsequently transferred to the cloud-based server. These events can be acted upon according to a time clock, and the outlets of the power strip(s) can be turned on or off with accurate timing. In another embodiment, the user application can also have a toggle switch button (e.g., hard or soft button or touch points on a touch-sensitive display device) where the user can manually turn power outlets on or off remotely via the remote server from the user's device.

The cloud-based remote server 103 may include one or more processing devices, a data storage or non-transitory memory that contains software code to cause the processing device to analyze the data captured by the sensors and transmitted by the sensing devices, and optionally a backend database and/or a user interface server to provide additional data and functionality. When a web user interface server is provided, the cloud server may generate a visual presentation of the data, such as one or more web pages containing the readings of sensors associated with the sensing devices or sensor data off an actuator (e.g., a WiFi-connected multi-outlet power strip). This may allow a user who has credentials that permit it to access the web pages to access hydroponic environment sensor data via a remote electronic device 105, and/or use the device 105 to generate commands to manually control the hydroponic environment actuator (power delivery device 107) through the remote server 103.

Figure 4:
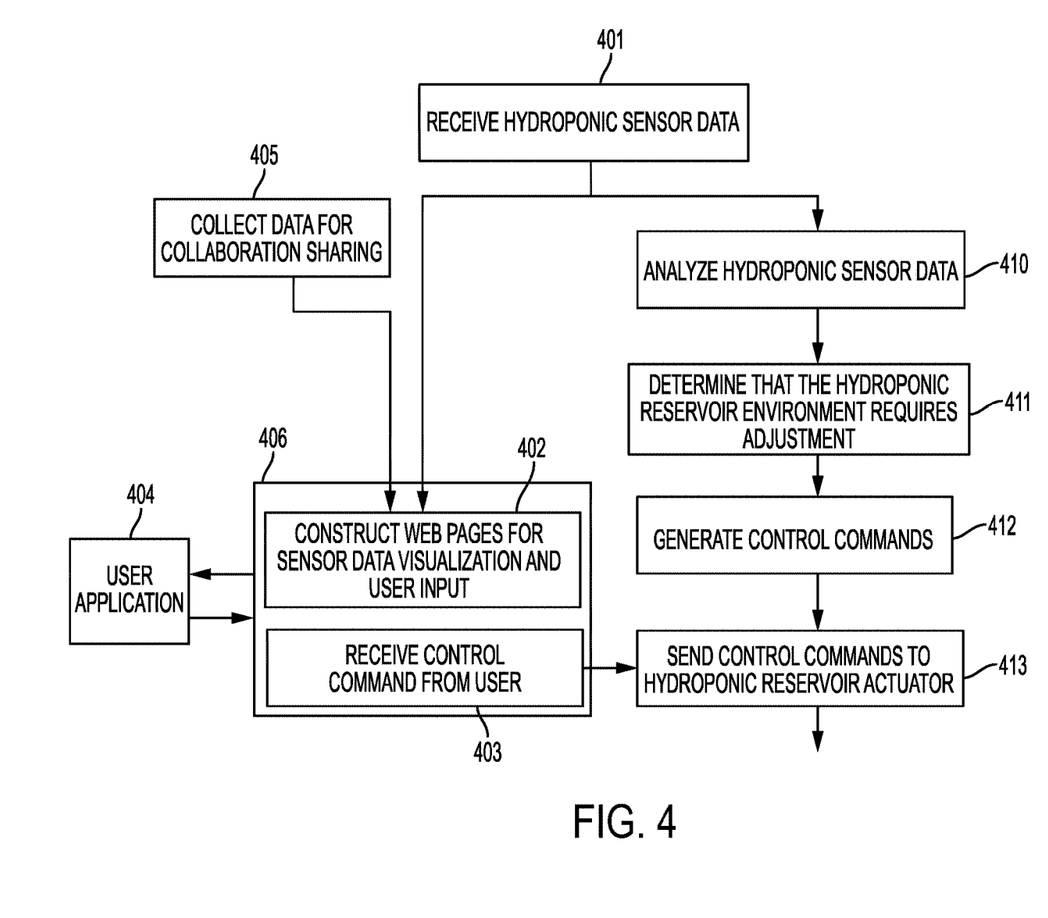
FIG. 4 illustrates an example of hydroponic environment control via a remote server.

In implementing the remote server, various communication protocols can be used between the remote server and the one or more sensing devices and/or the power delivery device. For example, a standard Internet protocol such as HTTP or a secured protocol can be used. In another example, a publication/subscription protocol, such as the MQTT messaging protocol via a central broker, can be used. With reference to FIG. 4, the cloud-based or otherwise remote server receives hydroponic sensor data 401 wirelessly from the hydroponic environment sensing device(s). The remote server's web user interface server 406 may construct one or more web pages 402 that can be accessed by a user application 404. The web pages may contain the received hydroponic sensor data or statistics or analytics of these data, and may contain multimedia data such as text, graphics, images, audio or video that can be visualized by the user. Examples of analytics of sensor data may include the history of each of the sensor readings, the trend and prediction of sensor readings, and alerts, if any of the readings exceeds a predefined, user-defined, or system defined desirable range. In one embodiment, the remote server may send the alerts via an email or SMS messaging to the user.

Based on viewing the sensor data, user may make determinations as to whether to adjust the hydroponic growing environment parameters, and accordingly transmit commands to control the hydroponic environment actuator via the web user interface server 406. In response to receiving user transmitted data or commands 403, the remote server sends control commands to the hydroponic reservoir actuator (e.g., the multi-outlet power delivery device) to make the growing environment adjustment.

In another embodiment, the remote server may also collect data from other data sources 405 that contain information relevant to the specific hydroponic environment the user is concerned with. For example, the other sources may include weather data to be presented to the user. In another example, the other sources may enable crowd-sourced sharing of information to allow collaborations among multiple users and systems. For example, the server may obtain "grow recipes" from other sources and use those recipes to control the delivery of nutrients, or affect other environmental conditions, in the environment.

The user application 404 may be executed on user's electronic device, such as a mobile device, a laptop, a tablet or the like, and it may communicate with the cloud server remotely via a custom made web-based mobile application or a standard web browser. The data communication between the mobile browser and the remote server's web user interface server 406 may employ an Internet protocol such as HTTP or secured protocols such as HTTPS or TLS encryption. As can be appreciated by a person ordinarily skilled in the art, other communication protocols can be used.

In another embodiment, with further references to FIG. 4, the cloud-based server may perform its own analysis based on the received hydroponic sensor data 410 and determine whether the hydroponic reservoir environment parameters need adjustment 411. If the remote server determines that an adjustment is needed, it generates one or more control commands 412 and sends control commands to the hydroponic reservoir actuator 413 automatically, thus automatically turning on or off associated environmental controls and maintaining a hydroponic growing environment with steady environmental conditions. In another embodiment, the analysis of sensor data and the control of the hydroponic growing environment can also be implemented in the user application 404 on user's electronic device.

The user application may cause the electronic device to output a user interface by which the device may receive a query about an environmental condition of the hydroponic growing environment (such as the reservoir). The electronic device may send the query to the remote server to extract, from the captured data in the database, a result that includes data which is responsive to the query. When the device receives the result, it will generate a visual representation of the result, and it will cause the electronic device's display device to display the visual representation.

The control for the hydroponic growing actuator, whether implemented on a cloud-based or otherwise remote server, or on the user's remote electronic device, is based on analyzing the readings of sensors. For example, the actuator could be used to automatically feed the plants, where the controller continuously monitors the EC/TDS (total dissolved solids) of the nutrient reservoir and applies rules to compare the monitored data to a range of thresholds (e.g. low and high thresholds). Based on the monitored data exceeding or going below a threshold or threshold range, the controller may trigger an outlet to activate a nutrient doser (e.g. a peristaltic pump) at the correct amount of time to deliver a set volume of nutrients to the bath. In another example, the system may use a $CO_2$ sensor's reading to trigger a solenoid valve that allows an injection of $CO_2$ gas into the room.

Various control algorithms can be used, such as a simple rule as "if below a threshold, turn on, if above a threshold, turn off," or an adaptive response algorithm using signal processing or fuzzy logic to bring conditions in line with minimal overshoot. As an non-limiting example, if the desired TDS level was 1000 ppm, a high level for an alert might be 1200 ppm in case something goes wrong (typically TDS will only fall), and a low level to trigger the injection of additional nutrient might be 950 ppm. In another example, $CO_2$ levels in a grow room are typically controlled at 1200 ppm (but only during lights-on), so the algorithm may trigger an injection $CO_2$ gas when the $CO_2$ falls to 1100 ppm. The injection may cause an overshoot, which will then deplete until again triggering a new injection at 1100 ppm. Practically, because overshoot may shock the plant, in one embodiment, fuzzy logic techniques can be used to measure the overshoot and adaptively modulate the injections to keep the average level as even as possible with minimal overshoots and wastage of gas or nutrient.

According to another embodiment, with reference to FIG. 1, the hydroponic environment actuator power delivery device 107 can also be in direct communication with the sensing devices 110, 111 without needing the cloud-based or otherwise remote server. In this embodiment, the power delivery device will include a communication interface, and optionally a processor and programming on a computer-readable medium so that the power delivery device can read sensor data from the sensing devices wirelessly and turn selected outlets on and off according to manual operation or rules or timers or other conditions, or by software code residing on a memory of the sensing device and/or power delivery device. Various timers and actuators, such as lights, fans, humidifiers, pH or nutrient dosers, reservoir chillers may be programmed and controlled based on the sensor readings, to the point of automating their function so the environmental parameters stay within a desired range.

The wireless communication between the actuator (e.g., the power strip) and sensing device can be established via WiFi or other wireless protocols such as Bluetooth, infrared, or near-field communication (NFC). Data communication can be based on TCP/IP, for example, the power strip can be a HTTP server and each of the sensors or sensing devices can be a HTTP client. In an additional and/or alternative embodiment, each of the sensors or the sensor devices can also be a web server. In one example, the MCU of a sensing device (110 or 111 in FIG. 1) determines whether the received sensor data is outside of a desired range of values for an environmental condition of the nutrient reservoir. If it is determined that the received data is outside the desired range (i.e., above or below a threshold), the MCU generates one or more commands and transmits the generated command to the multi-outlet power via the WiFi network so that the controller of the multi-outlet power delivery device will switch on/off selected outlets associated with the environmental controller.

In one embodiment, the power delivery device 107 may also comprise sensors to report back readings of the operation of the power strip such as voltage, amps, and watts per outlet to the various equipment to which it connects. A cloud based remote server that receives sensor data from the power delivery device can assist the user (or grower) to monitor, analyze and perform trouble-shooting of the equipment. For example, if a 1000W (watts) grow light is consuming much more or much less than the nominal wattage, it could be malfunctioning and require replacement.

Figure 5:
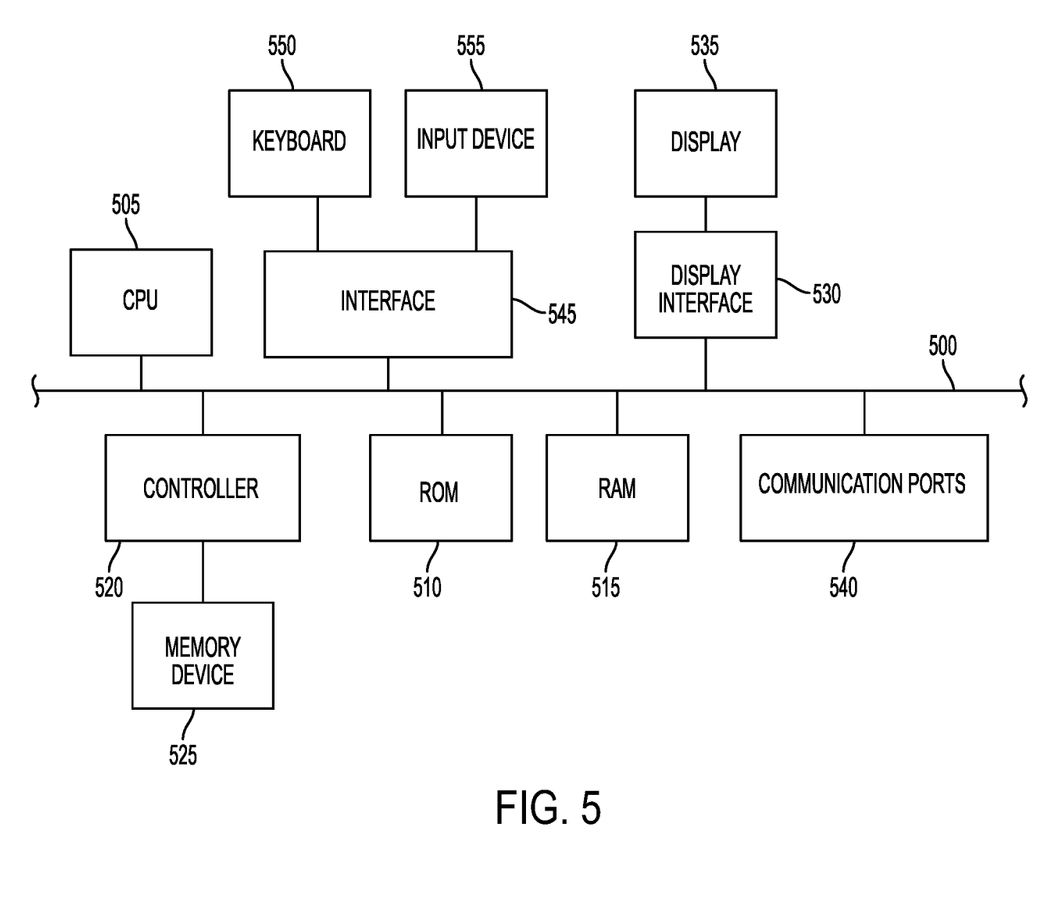
FIG. 5 depicts various embodiments of one or more electronic devices for implementing the various methods and processes described herein.

FIG. 5 depicts an example of internal hardware that may be included in any of the electronic components of the system, the user device, node or remote server or another device in the system. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 510. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device and/or an audio input device. Data also may be received from other controllers 520 and memory device 525 such as a USB flash drive. A positional sensor 555 may be included to detect the location of the user, and such information can be included in the signed data packet for verification.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for controlling a hydroponic growing environment, the system comprising:
    a multi-outlet power delivery device comprising a plurality of power outlets, a communication interface, a computer-readable medium having programming instructions and a controller configured to selectively switch each of the power outlets on or off in response to commands received via the communication interface; and
    a hydroponic reservoir sensing device comprising:
        a probe containing one or more reservoir sensors configured to monitor one or more parameters of a nutrient solution in a hydroponic reservoir,
        a transmitter, and
        a controller configured to:
            receive data captured by the one or more reservoir sensors,
            determine whether the received data is outside of a desired range of values for an environmental condition of the hydroponic reservoir, and
            in response to determining that the received data is outside of the desired range of values:
                identify an environmental controller that, when activated or deactivated, will alter the environmental condition,
                generate a command to turn the environmental controller on or off, and
                cause the transmitter to transmit the generated command to the multi-outlet power delivery device via a communications network;
    wherein the programming instructions on the computer-readable memory of the power delivery device are configured to cause the controller of the multi-outlet power delivery device to:
        receive the generated command and switch an outlet associated with the environmental controller on or off based on at least a timer and one or more rules in response to the generated command, wherein the timer and the one or more rules control the function of the environmental controller so that one or more environmental parameters stay within the desired range.

2. The system of claim 1, further comprising an air sensing device comprising:
    a probe containing one or more air sensors configured to monitor one or more parameters of air that is proximate to a plant in the hydroponic growing environment;

a transmitter; and
a controller configured to:
receive data captured by the one or more air sensors,
determine whether the received data captured by the one or more air sensors is outside of a desired range of values for an environmental condition of the air that is proximate to the plant, and
in response to determining that the received data is outside of the desired range of values:
identify an environmental controller that, when activated or deactivated, will alter the environmental condition,
generate a command to turn the environmental controller on or off, and
cause the transmitter to transmit the generated command to the multi-outlet power delivery device via a communications network so that the controller of the multi-outlet power delivery device will switch an outlet associated with the environmental controller on or off in response to the generated command.

3. The system of claim 1, wherein the one or more reservoir sensors comprise an electrical conductivity sensor or a pH sensor or a reservoir temperature sensor.

4. The system of claim 1, wherein the environmental controller comprises a nutrient doser, a pump, a light, a fan, a gas solenoid valve or a liquid solenoid valve.

5. The system of claim 1, wherein the environmental controller comprises a heater, an air conditioning unit, a humidifier, or a reservoir chiller.

6. The system of claim 1, wherein the environmental controller is configured to adaptively modulate an injection level to minimize overshoot when the environmental controller is turned on.

7. The system of claim 1, further comprising a remote server, the remote server comprising a receiver, a data storage facility and a computer-readable medium containing programming instructions that are configured to cause the server to receive, via the receiver, the captured data from the transmitter of the hydroponic reservoir sensing device and store the captured data in the data storage facility.

8. The system of claim 7, further comprising a user device, the user device comprising:
a processing device;
a communications system;
a display device;
a user interface; and
a computer-readable medium containing programming instructions that are configured to cause the user device to:
receive, via the user interface, a query about an environmental condition of the hydroponic reservoir,
send the query to the remote server,
receive resulting data responsive to the query, the resulting data containing the environmental condition of the hydroponic reservoir from the remote server,
generate a visual representation of the resulting data, and
cause the display device to display the visual representation.

9. The system of claim 7, wherein:
the received data comprises a $CO_2$ level, and the environmental controller comprises a valve that allows an injection of $CO_2$ gas into a room in which the hydroponic reservoir is located.

10. The system of claim 1, wherein the received data comprises a total dissolved solids level, and the environmental controller comprises a nutrient doser.

11. The system of claim 1, wherein the programming instructions on the computer-readable memory of the power delivery device include additional programming instructions that are configured to cause the controller of the multi-outlet power delivery device to:
transmit readings of operation of an equipment connected to the outlet associated with the environmental controller to the hydroponic reservoir sensing device, wherein the readings include voltage, amps or watts per outlet.

12. A method for controlling a hydroponic growing environment, the method comprising:
receiving, by a reservoir sensing device, data captured by one or more reservoir sensors configured to monitor one or more parameters of a nutrient solution in a hydroponic reservoir;
determining, by the reservoir sensing device, whether the received data is outside of a desired range of values for an environmental condition of the hydroponic reservoir; and
in response to determining that the received data is outside of the desired range of values:
identifying, by the reservoir sensing device, an environmental controller that, when activated or deactivated, will alter the environmental condition,
generating, by the reservoir sensing device, a command to turn the environmental controller on or off,
transmitting, by the reservoir sensing device the generated command to a multi-outlet power delivery device via a communications network, and
receiving, by a controller of the multi-outlet power delivery device the generated command and switching an outlet associated with the environmental controller on or off based on a timer and one or more rules in response to the generated command, wherein at least the timer and the one or more rules control the function of the environmental controller so that one or more environmental parameters stay within the desired range.

13. The method of claim 12, further comprising:
receiving, by an air sensing device, data captured by one or more air sensors configured to monitor one or more parameters of air that is proximate to a plant in the hydroponic growing environment, wherein the one or more air sensors comprise at least an air temperature sensor, an air humidity sensor or a $CO_2$ sensor;
determining, by the air sensing device, whether the received data is outside of a desired range of values for an environmental condition of the air that is proximate to the plant; and
in response to determining that the received data is outside of the desired range of values:
identifying, by the air sensing device, an environmental controller that that, when activated or deactivated, will alter the environmental condition,
generating, by the air sensing device, a command to turn the environmental controller on or off, and
transmitting, by the air sensing device the generated command to a multi-outlet power delivery device via a communications network so that a controller of the multi-outlet power delivery device will switch an outlet associated with the environmental controller on or off in response to the generated command.

14. The method of claim 12, wherein the one or more reservoir sensors comprise an electrical conductivity sensor or a pH sensor or a reservoir temperature sensor.

15. The method of claim 12, wherein the environmental controller comprises a nutrient doser, a pump, a light, a fan, a gas solenoid valve or a liquid solenoid valve.

16. The method of claim 12, wherein the environmental controller comprises a heater, an air conditioning unit, a humidifier, or a reservoir chiller.

17. The method of claim 12, wherein the environmental controller is configured to adaptively modulate an injection level to minimize overshoot when the environmental controller is turned on.

18. The method of claim 12, further comprising:
receiving, by a remote server, from the hydroponic reservoir sensing device the captured data by the one or more reservoir sensors, wherein the remote server comprises a data storage facility; and
storing, by the remote server, the captured data in the data storage facility of the remote server.

19. The method of claim 18, further comprising:
receiving, via a user interface of a user device, a query about an environmental condition of the hydroponic reservoir, wherein the user device comprises a display device;
sending, by the user device, the query to the remote server;
in response to sending the query, receiving, by the user device, data containing the environmental condition of the hydroponic reservoir from the remote server;
generating, by the user device, a visual representation of the received data; and
displaying the visual representation on the display device.

20. The method of claim 18, wherein:
the received data comprises a $CO_2$ level; and
the environmental controller comprises a valve that allows an injection of $CO_2$ gas into a room in which the hydroponic reservoir is located.

21. The method of claim 12, wherein the received data comprises a total dissolved solids level, and the environmental controller comprises a nutrient doser.

22. The method of claim 12 further comprising, by the controller of the multi-outlet power delivery device:
transmitting readings of operation of an equipment connected to the outlet associated with the environmental controller to the hydroponic reservoir sensing device, wherein the readings include voltage, amps or watts per outlet.

* * * * *